United States Patent
Soszka

[19]

[11] Patent Number: 5,915,405
[45] Date of Patent: Jun. 29, 1999

[54] TWO-WAY DIVERTER CHECK VALVE

[76] Inventor: Adam Soszka, 79 Yorkview Dr., Etobicoke, Ontario, Canada, M8Z 2G3

[21] Appl. No.: 08/837,291

[22] Filed: Apr. 11, 1997

[30] Foreign Application Priority Data

Apr. 15, 1996 [CA] Canada .................................. 2174148

[51] Int. Cl.$^6$ ................................................. F16K 11/052
[52] U.S. Cl. ........................................... 137/107; 137/565
[58] Field of Search ............................. 137/61, 102, 107, 137/302, 304, 565

[56] References Cited

U.S. PATENT DOCUMENTS

| 65,490 | 6/1867 | Karr | 137/107 |
|---|---|---|---|
| 154,390 | 8/1874 | Hartman | 137/107 |
| 396,765 | 1/1889 | Power | 137/107 |
| 1,180,817 | 4/1916 | Ballard . | |
| 1,438,973 | 12/1922 | Van der Volgen | 137/107 |
| 1,765,490 | 6/1930 | Janette | 137/107 X |
| 2,512,695 | 6/1950 | Stout et al. | 277/71 |
| 2,725,076 | 11/1955 | Hasen et al. | 137/543.15 |
| 2,791,228 | 5/1957 | Carr et al. | 137/107 |
| 3,202,165 | 8/1965 | Yavicolin | 137/107 |
| 3,974,848 | 8/1976 | Wheatley | 137/102 |
| 4,457,330 | 7/1984 | Fields | 137/107 |
| 4,523,604 | 6/1985 | Hutto | 137/107 X |

*Primary Examiner*—Stephen M. Hepperle
*Attorney, Agent, or Firm*—Peter R. Hammond; Barrigar & Moss

[57] ABSTRACT

A two way check valve used in a water supply system including a hollow valve body forming a valve chamber with first and second valve seats located in this chamber. The body has an inlet and two outlet ports. A valve or gate member is mounted in the valve body and is capable of pivoting between the first valve seat and the second seat. An elongate coil spring biases the valve member to pivot towards and engage the first seat. Water can flow under pressure from the inlet to a first of the outlet ports but not to the second outlet port. Water can flow in a reverse direction into the first outlet port and is diverted by the valve member out through the second outlet port. The reverse flow is prevented from flowing out the valve inlet.

16 Claims, 3 Drawing Sheets

TWO-WAY DIVERTER CHECK VALVE

BACKGROUND OF THE INVENTION

The present invention relates to check valves and, in particular, valves suitable for mounting in a liquid supply line.

Self draining water systems for the supply of water to a dwelling or building are known. Such systems involve pumping water from a source to a destination such as a building by means of a submersible pump or other type of pump. Such systems are often used in areas that are subject to winter conditions where water lines can freeze if exposed. If the water system will be used in such winter conditions, it is important that the water system be set up so that the water line which is subject to freezing conditions will automatically drain whenever the pump stops, thus preventing freeze up. A known drawback of such a water supply system however is that when the water drains from the waterline it does so through the submersible pump. Because of this there is a good possibility that the pump motor will be damaged if the pump starts while water is draining through it. Before the present invention, there was no known method for alleviating this problem.

It is an object of the present invention to provide a check valve that eliminates the aforementioned disadvantage associated with the known self-draining water system. With the use of the present check valve, the draining of the water back through the pump is prevented. It is a further object of the invention to provide a check valve which is simple in its construction and can be manufactured at reasonable cost.

SUMMARY OF THE INVENTION

According to one aspect of the invention, a check valve for mounting in a liquid supply line includes a hollow valve body forming a valve chamber and first and second valve seats located in this chamber. The valve body has an inlet and two outlet ports. A valve member is mounted in the valve body and is capable of pivoting between the first valve seat and the second valve seat. There are also means for biasing the valve member to pivot towards and engage the first valve seat. A liquid, such as water, can flow under pressure from the inlet to a first of the outlet ports but not to the second of the outlet ports. Liquid can also flow in a reverse direction into the first outlet port, such liquid being diverted by the valve member out through the second of the outlet ports and being prevented from flowing out the inlet of the valve.

In a preferred embodiment, the biasing means is a coil spring.

According to a further aspect of the invention, a check valve with three ports includes a valve body forming a valve chamber and a first valve seat located in the chamber. The valve body includes a first inlet port and a second port. A gate valve member is mounted in the valve body and is capable of pivoting between a first position where the valve member engages the first valve seat and a second position. A spring is provided to bias the gate valve member to pivot towards the first valve seat. Pipe means forms a second valve seat and is mounted in the valve body. This pipe means also forms a third port for the valve. A liquid can flow under pressure from the first inlet port to the second port but not out the third port due to movement of the gate valve member to the second position where the gate valve member engages the second valve seat. Liquid can also flow in a reverse direction into the second port but the liquid is diverted by the gate valve member through the third port and is prevented from flowing out the first inlet port.

According to another aspect of the invention, a pump apparatus for a self-draining water supply system comprises a submersible pump for pumping water to the system and a check valve having an inlet connected to an outlet of the pump and having two outlet ports. This valve includes a valve body forming a valve chamber with first and second valve seats arranged therein. A valve gate member mounted in the valve body is capable of pivoting between the first valve seat and the second valve seat. A spring biases the gate member to pivot towards and engage the first valve seat. Water can flow under pressure from the pump, through the inlet and to a first of the outlet ports, but not to the second of the outlet ports. Water can also flow in a reverse direction into the first outlet port in order to drain the system and is diverted by the valve member through the second outlet port.

The check valve described herein can be attached to the water line directly above the submersible pump. When the pump starts, water flows into the check valve and causes the valve gate member therein to move up closing the second of the outlet ports. The water is then free to flow through the first outlet port which is connected to the water supply line. Then, when the pump stops, water in the line will drain back in the opposite direction. The spring in the valve moves the gate member downwardly so that it engages the first valve seat, thereby preventing the flow of water out through the valve inlet to the water pump. The back flowing water is diverted through the second outlet port of the valve. In this way, the submersible pump is prevented from being damaged by the back flowing water.

The present check valve can be used in any case where it is desirable to divert the flow of any liquid that is flowing in a predetermined direction through the valve.

Further features and advantages will become apparent from the following detailed description taken in conjunction with the accompanying drawings.

DETAILED DESCRIPTION OF PREFERRED EMBODIMENT

Figure 1:
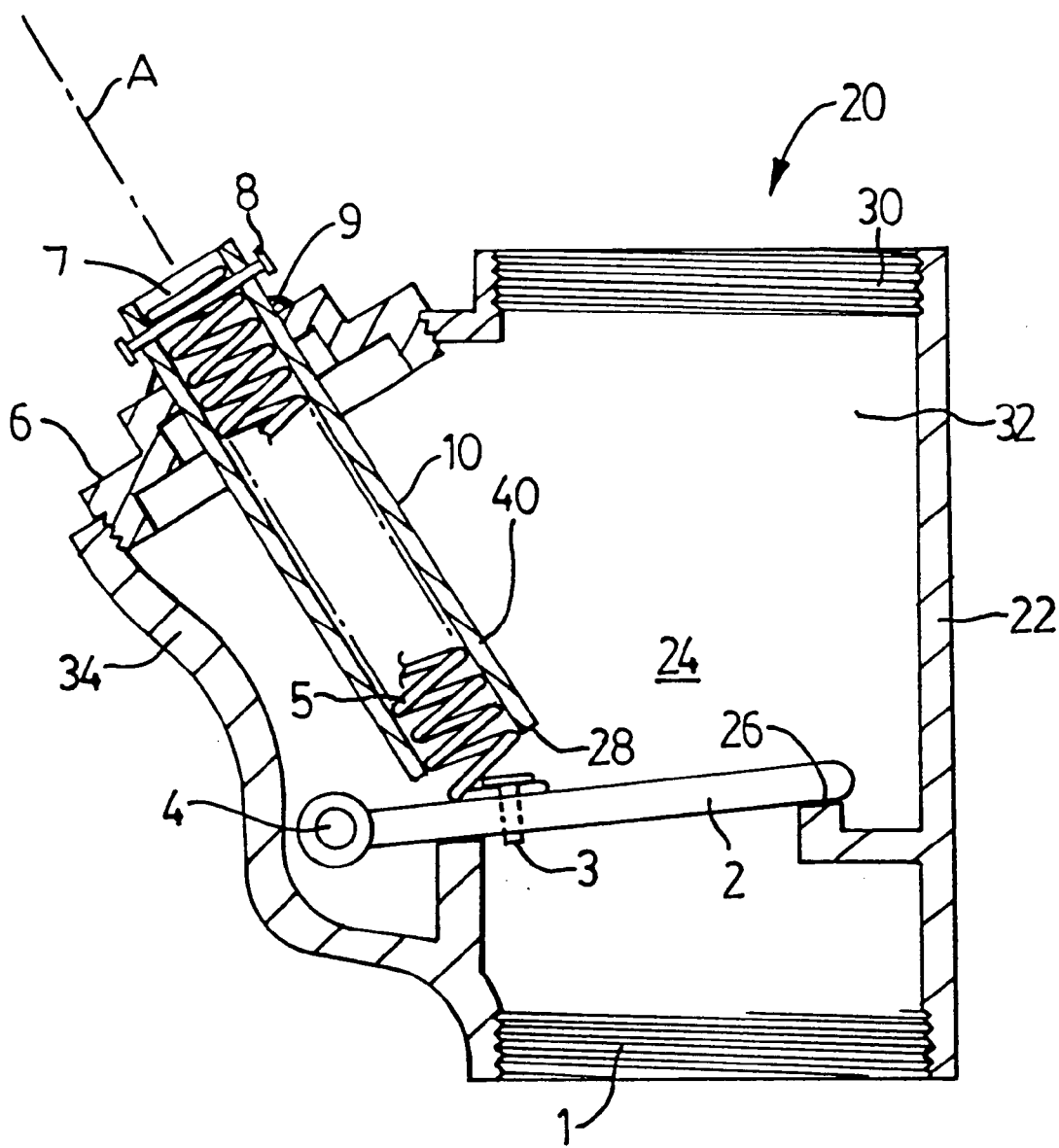
FIG. 1 is an axial cross-section of a check valve constructed in accordance with the invention, the valve being shown with no liquid flowing through it.

The drawings illustrate a preferred embodiment of a two-way diverter check valve 20 for mounting in a liquid supply line (not shown). The valve has a hollow valve body 22 which forms a valve chamber 24. Located in the chamber are a first valve seat 26 and a second valve seat 28. The valve body has an inlet 1 at its bottom end, which inlet is preferably a circular opening. The valve also has two outlet ports with the first and primary outlet port being indicated at 30 and the second outlet port being located at 7. The preferred outlets shown are circular openings. In the illustrated preferred embodiment, both the inlet 1 and the first outlet port 30 are internally threaded for connection of the valve to a supply line.

The valve body 22 includes a generally cylindrical main section indicated at 32 which extends between the inlet 1 and the first outlet port 30 and an extension section 34 located on one side of the main section. The aforementioned second outlet port 7 is located in this extension section 34. The extension section is also substantially hollow and is partially cylindrical in shape. The main section 32 has a central axis extending from the inlet 1 to the first outlet 30. A central longitudinal axis indicated at A in FIG. 1 of the extension section extends at an acute angle to the central axis of the main section. In the illustrated preferred embodiment, this acute angle is approximately 45 degrees.

A hollow cylindrical tube or pipe 10 which can be a relatively short pipe member extends down the centre of the extension section 34 and this tube or pipe is open at both ends. An inner end section 40 extends slightly into the main section 32 of the valve body. The pipe 10 is rigidly and fixedly attached to a threaded plug 6 located at an outer end of the extension section 34. The pipe 10 which forms the second outlet port can be connected to the plug 6 by welding or solder at 9. It will be understood that the plug 6 is threaded into the valve body and therefore is detachable therefrom. The pipe member 10 is coaxial with the threaded plug 6 and extends through a central opening formed in the plug.

Inside the valve chamber 24 is a valve member 2 in the form of a hinged gate. The valve member is mounted in the valve body 22 and is capable of pivoting between the first valve seat 26 and the second valve seat 28. The valve member 2 is secured by means of a shaft 4 which is mounted in a hole or holes drilled into the valve body 22. There are means for biasing the valve member 2 to pivot towards and engage the first valve seat 26. The preferred biasing means is a coil spring 5, preferably a metal spring. As illustrated, the spring 5 can be mounted in the pipe member 10 and, in the illustrated embodiment, the spring runs the length of the pipe. The preferred spring is an elongate coil spring which can be connected at one end thereof to the pipe by means of a pin 8. In the illustrated valve, the pin 8 is located at the top end of the pipe 10. It will be understood that the gate member 2 with the assistance of the spring 5 regulates the direction of the liquid or water passing through the valve. The threaded plug 6 and the pipe 10 which are rigidly connected together can be considered pipe means which form the second valve seat 28 at an inner end thereof. This pipe means is mounted in the valve body 22 and forms a second outlet which is one of three ports in the check valve 20.

Figure 2:
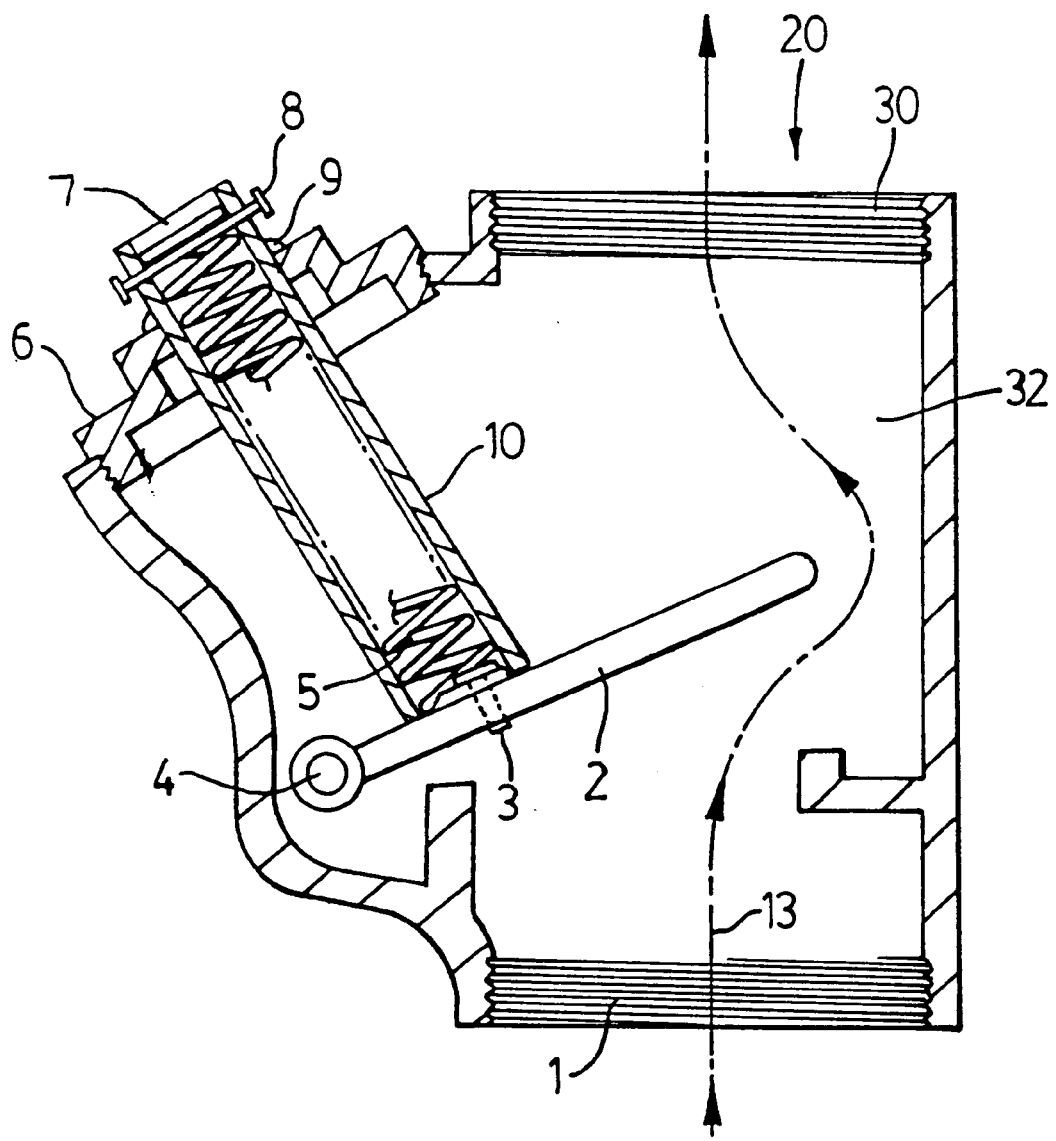
FIG. 2 is an axial cross-section similar to FIG. 1 but showing the valve member in a raised position so that liquid flows through the valve in an upward direction.

FIG. 2 demonstrates the operation of the check valve 20 when a liquid such as water flows through it in an upward direction. It will be understood that the inlet 1 may be connected to the outlet of a submersible pump (not shown) for pumping water to a self-draining water supply system. The direction of liquid flow is indicated by the flowline at 13. The pressure of the liquid causes the hinge gate or valve member 2 to move to a second, upward position. In this position, it lies flush against the valve seat at the end of discharge tube or pipe 10. Thus, the flowing water is prevented from escaping through the pipe 10 and is forced to exit the valve through the first outlet port 30.

Figure 3:
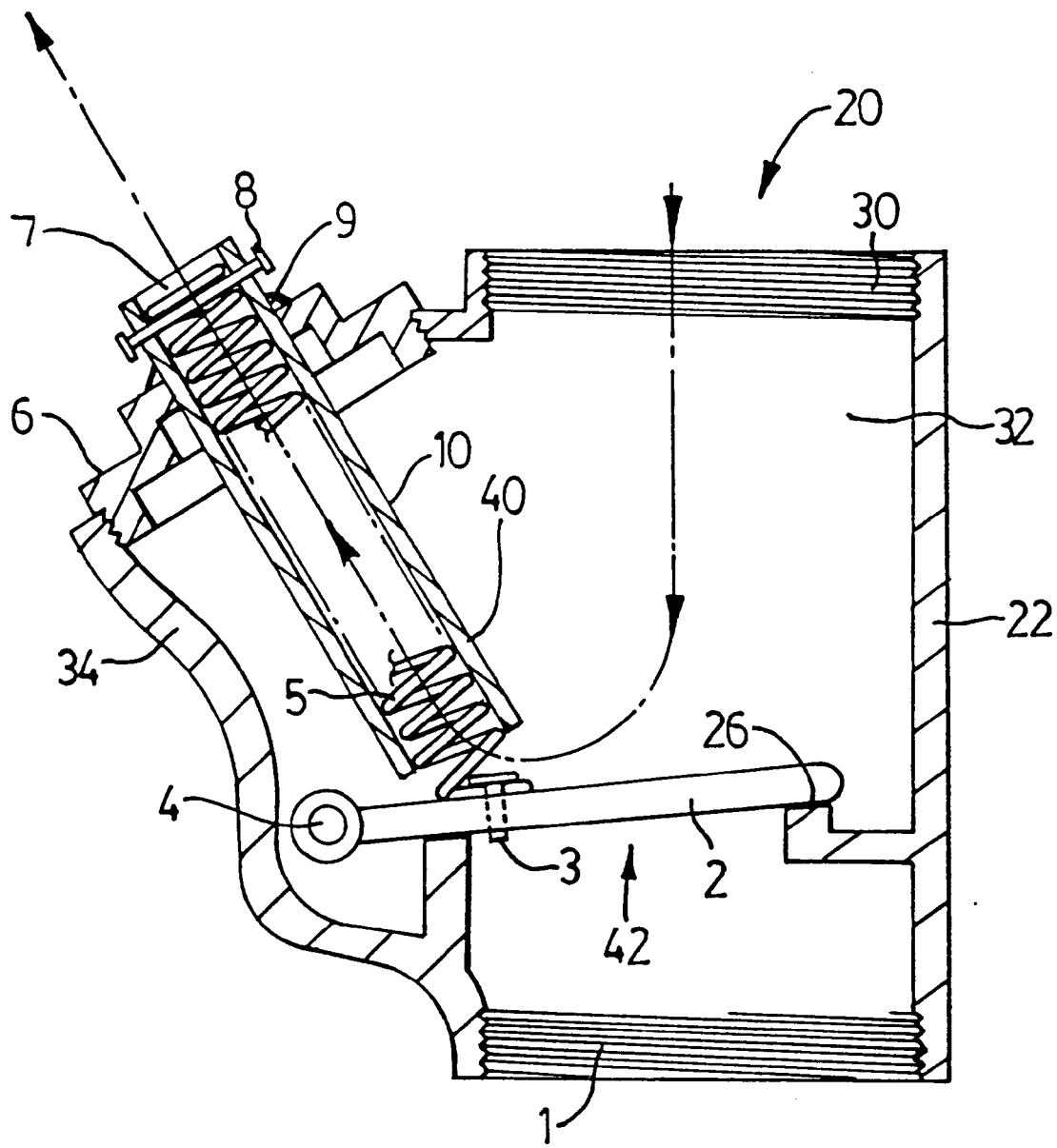
FIG. 3 is a further axial cross-section of the valve with the valve member being shown engaging a first valve seat where it diverts a downward flow of liquid through a second outlet port.

FIG. 3 demonstrates the operation of the check valve when liquid or water flows through it in a downward direction. This will occur if the water system is draining after the pump shuts down. In this case, the water enters the check valve 20 through the first outlet port 30. Through a combination of the downward pressure of the liquid flowing into the check valve and the force exerted by the coil spring 5, the hinge gate 2 moves to its downward position and engages the first valve seat 26. In this position, the valve member closes off the circular opening 42 defined by the first valve seat. Thus, the liquid or water cannot flow through the opening 42 and the valve inlet 1 but instead is diverted by the valve member 2 through the second outlet port 7.

Although only one preferred embodiment of the invention has been described and illustrated herein, it will be understood by those skilled in the art that various modifications and changes can be made to the check valve of this invention without departing from the spirit and scope thereof. The present invention is not limited to the preferred embodiment described herein but includes all variations and modifications as fall within the scope of the appended claims.

I claim:

1. A check valve for mounting in a liquid supply line comprising:

a hollow valve body forming a valve chamber and first and second valve seats located in said chamber, said valve body having an inlet and two outlet ports;

a valve member mounted in said valve body and capable of pivoting between said first valve seat and said second valve seat; and means for biasing said valve member to pivot towards and engage said first valve seat, said biasing means being a coil spring, wherein a liquid can flow under pressure from said inlet to a first of said outlet ports but not to the second of said outlet ports and liquid flow in a reverse direction into said first outlet port is diverted by the valve member out through the second of the outlet ports and is prevented from flowing out the inlet, said second outlet port being formed by a pipe member that extends into said valve chamber and has an inner end, said inner end forming second valve seat, and wherein said coil spring is mounted in said pipe member.

2. A check valve according to claim 1 wherein said valve body includes a generally cylindrical main section extending between said inlet and said first outlet port and an extension section located on one side of said main section, said second outlet port being located in said extension section.

3. A check valve according to claim 2 wherein said main section has a central axis extending from said inlet to said first outlet and a central longitudinal axis of said extension section extends at an acute angle to the central axis of the main section.

4. A check valve according to claim 3 wherein said extension section includes a threaded plug at an outer end thereof, said plug being threaded into said valve body and detachable therefrom.

5. A check valve for mounting in a liquid supply line comprising:

a hollow valve body forming a valve chamber and first and second valve seats located in said chamber, said valve body having an inlet and two outlet ports, said valve body including a generally cylindrical main section extending between said inlet and a first of said outlet ports and an extension section located on one side of said main section, the second outlet port being located in said extension section, said extension section including a threaded plug at an outer end thereof, said plug being threaded into said valve body and detachable therefrom, a pipe member rigidly mounted in said threaded plug and co-axial therewith a valve member mounted in said valve body and capable of pivoting between said first valve seat and said second valve seat; and means for biasing said valve member to pivot towards and engage said first valve seat, wherein a liquid can flow under pressure from said inlet to the first of said outlet ports but not to the second of said outlet ports and liquid flow in a reverse direction into said first outlet port is diverted by the valve member out through said second of the outlet ports and is prevented from flowing out the inlet.

6. A check valve according to claim 3 wherein said acute angle is approximately 45 degrees.

7. A check valve for mounting in a liquid supply line comprising:

a hollow valve body forming a valve chamber and first and second valve seats located in said chamber, said valve body having an inlet and two outlet ports;

a valve member mounted in said valve body and capable of pivoting between said first valve seat and said second valve seat; and means for biasing said valve member to pivot towards and engage said first valve seat, said biasing means being a coil spring;

wherein a liquid can flow under pressure from said inlet to a first of said outlet ports but not to the second of said outlet ports and liquid flow in a reverse direction into said first outlet port is diverted by the valve member out through the second of the outlet Ports and is prevented from flowing out the inlet;

wherein both said inlet and said first outlet port are internally threaded for connection of the valve to said supply line.

8. A check valve with three ports, said valve comprising:

a valve body forming a valve chamber and a first valve seat located in said chamber, said valve body including a first inlet port and a second port;

a gate valve member mounted in said valve body and capable of pivoting between a first position where said valve member engages said first valve seat and a second position;

a spring for biasing said gate valve member to pivot towards said first valve seat, said spring being an elongate coil spring; and pipe means forming a second valve seat, said pipe means being mounted in said valve body and forming a third port for the valve, said spring being mounted in said pipe means, wherein a liquid can flow under pressure from said first inlet port to said second port but not out said third port due to movement of said gate valve member to said second position where said gate valve member engages said second valve seat and liquid flow in a reverse direction into said second port is diverted by the gate valve member through said third port and is prevented from flowing out said first inlet port.

9. A check valve according to claim 8 wherein said coil spring is connected at one end thereof to said pipe means by means of a pin.

10. A check valve according to claim 8 wherein said valve body includes a generally cylindrical, main section extending between said first inlet port and said second port and an extension section located on one side of said main section, said pipe means being rigidly mounted in said extension section.

11. A check valve with three Ports, said valve comprising:

a valve body forming a valve chamber and first valve seat located in said chamber, said valve body including a first inlet port and a second port;

a gate valve member mounted in said valve body and capable of pivoting between a first position where said valve member engages said first valve seat and a second position;

a spring for biasing said gate valve member to pivot towards said first valve seat: and pipe means forming a second valve seat, said pipe means being mounted in said valve body and forming a third port for the valve, said pipe means including an externally threaded plug and a pipe member fixedly mounted in said plug and extending therethrough, said spring being mounted in said pipe member, wherein a liquid can flow under pressure from said first inlet port to said second port but not out said third port due to movement of said gate valve member to said second position where said gate valve member engages said second valve seat and liquid flow in a reverse direction into said second port is diverted by the gate valve member through said third port and is prevented from flowing out said first inlet port.

12. A pump apparatus for self-draining water supply system, said apparatus comprising:

a submersible pump for pumping water to said system; and a check valve having an inlet connected to an outlet of said pump and having two outlet ports, said valve including a valve body forming a valve chamber with first and second valve seats arranged therein;

a valve gate member mounted in said valve body and capable of pivoting between said first valve seat and said second valve seat; and spring means for biasing said gate member to pivot towards and engage said first valve seat;

wherein water can flow under pressure from said pump, through said inlet, and to a first of said outlet ports, but not to the second of the outlet ports, and water flow in a reverse direction into said first outlet port in order to drain said system is diverted by the gate member through the second outlet port.

13. A pump apparatus according to claim 12 wherein said spring means is an elongate coil spring.

14. A pump apparatus according to claim 13 wherein said valve body includes a short pipe member having an inner end which forms said second valve seat.

15. A pump apparatus according to claim 14 wherein said valve body further includes a threaded plug detachably connected to a main section of the valve body, said pipe member being fixedly mounted in said plug.

16. A pump apparatus according to claim 13 wherein said gate member is pivotally secured to the valve body by a shaft mounted at one side of the valve body.

* * * * *